(12) United States Patent
Sun

(10) Patent No.: US 10,016,930 B2
(45) Date of Patent: Jul. 10, 2018

(54) PRINTING METHOD OF 3D PRINTER

(71) Applicant: Woosung Sun, Uijeongbu-si (KR)

(72) Inventor: Woosung Sun, Uijeongbu-si (KR)

(*) Notice: Subject to any disclaimer, the term of this patent is extended or adjusted under 35 U.S.C. 154(b) by 0 days.

(21) Appl. No.: 15/269,947

(22) Filed: Sep. 19, 2016

(65) Prior Publication Data

US 2017/0282460 A1 Oct. 5, 2017

(30) Foreign Application Priority Data

Apr. 1, 2016 (KR) .......................... 10-2016-0039980

(51) Int. Cl.
| | | |
|---|---|---|
| *B29C 64/40* | (2017.01) | |
| *B29C 64/176* | (2017.01) | |
| *B33Y 10/00* | (2015.01) | |
| *B33Y 40/00* | (2015.01) | |
| *B33Y 50/02* | (2015.01) | |
| *B29C 67/00* | (2017.01) | |
| *B29C 64/386* | (2017.01) | |

(52) U.S. Cl.
CPC .......... *B29C 64/40* (2017.08); *B29C 64/176* (2017.08); *B29C 67/0088* (2013.01); *B29C 67/0092* (2013.01); *B33Y 10/00* (2014.12); *B33Y 40/00* (2014.12); *B33Y 50/02* (2014.12); *B29C 64/386* (2017.08)

(58) Field of Classification Search
CPC .......... B29C 67/0088; B29C 67/0092; B29C 64/004; B29C 64/0176
See application file for complete search history.

(56) References Cited

U.S. PATENT DOCUMENTS

2016/0207260 A1* 7/2016 Lee .................... B29C 67/0085

FOREIGN PATENT DOCUMENTS

KR 10-2016-0021540 A 2/2016

OTHER PUBLICATIONS

"Erica Seccombe." Erica Seccombe—Printing Time—Work in progress VCCVAFS <www.ericaseccombe.com.au/item.asp?iID=41>.*

(Continued)

*Primary Examiner* — Alison L Hindenlang
*Assistant Examiner* — Nicholas R Krasnow
(74) *Attorney, Agent, or Firm* — Novick, Kim & Lee, PLLC; Sang Ho Lee

(57) ABSTRACT

Provided is a printing method of a 3D printer. The printing method uses a 3D printer including a nozzle control module configured to transfer a nozzle to a predetermined location on a plane, and a pair of transfer modules disposed perpendicular to the plane and spaced apart from each other, the method comprising: (a) positioning a first bed between the pair of transfer modules to be in contact with the pair of transfer modules; (b) when the pair of transfer modules moves the first bed downwards, by the nozzle control module, controlling the nozzle to discharge raw materials and thus printing a first printout on the first bed, and also forming a first support on the first bed around the first printout to make a friction with the pair of transfer modules; (c) after the first printout is completely made, forming a second bed above the first printout; and (d) forming a second printout on the second bed, and also forming a second support around the second printout to make a friction with the pair of transfer modules.

6 Claims, 9 Drawing Sheets

(56) References Cited

OTHER PUBLICATIONS

"To Stack or to Pack? That is the Question" by 3D Quick Print | Sep. 10, 2015 <https://www.3dquickprinting.com/3d-printing/to-stack-or-to-pack-that-is-the-question/>.*

"Printing multiple prints stacked on top of each other" Mar. 25 2016 <https://3dprinting.stackexchange.com/questions/860/printing-multiple-prints-stacked-on-top-of-each-other/861>.*

* cited by examiner

PRINTING METHOD OF 3D PRINTER

CROSS-REFERENCE TO RELATED APPLICATIONS

The instant application claims priority to Korean patent application No. 10-2016-0039980 filed on Apr. 1, 2016, the entire content of which is hereby incorporated by reference.

TECHNICAL FIELD

The present disclosure relates to a printing method of a 3D printer.

BACKGROUND ART

A 3D printer is a device for making a three-dimensional real object by successively injecting predetermined raw materials and stacking the raw materials layer by layer in a minute thickness on the basis of a 3D plan. The 3D printer has been developed for manufacturing objects, and various products may be manufactured using the 3D printer.

An existing 3D printer stacks raw materials on a bed successively. At this time, if the bed is not agreeably coupled with a raw material at an initial stage, a printout may shrink and bent as the melted raw material is cooled. This is because a material of the bed is different from the raw material and thus the raw material is not easily adhered to the bed.

In addition, if a printout (a 3D object) is output onto the bed and then it is intended to output another printout, the printout on the bed should be removed and then the bed should be set to the 3D printer again. Thus, the existing 3D printer is not able to output several printouts successively.

DISCLOSURE

Technical Problem

The present disclosure is directed to providing a printing method of a 3D printer, which may several printouts successively.

In addition, the present disclosure is directed to providing a printing method of a 3D printer, which may ensure excellent adhesion between a printout and a bed by using a bed made of the same material as the printout.

In addition, the present disclosure is directed to providing a printing method of a 3D printer, which may output an elongated printout with a complicated inner structure.

Technical Solution

In one aspect of the present disclosure, there is provided a printing method of a 3D printer, which uses a 3D printer 1 including:

a nozzle control module 10 configured to transfer a nozzle 11 to a predetermined location on a plane; and a pair of transfer modules 21, 22 disposed perpendicular to the plane and spaced apart from each other, the method comprising:

(a) positioning a first bed 31 between the pair of transfer modules 21, 22 to be in contact with the pair of transfer modules 21, 22;

(b) when the pair of transfer modules 21, 22 moves the first bed 31 downwards, by the nozzle control module 10, controlling the nozzle 11 to discharge raw materials and thus printing a first printout 100 on the first bed 31, and also forming a first support 41 on the first bed 31 around the first printout 100 to make a friction with the pair of transfer modules 21, 22;

(c) after the first printout 100 is completely made, forming a second bed 32 above the first printout 100; and (d) forming a second printout 200 on the second bed 32, and also forming a second support 42 around the second printout 200 to make a friction with the pair of transfer modules 21, 22.

In addition, there is provided a printing method of a 3D printer, in which the first bed 31 and the first printout 41 are made of the same material.

Advantageous Effects

The present disclosure provides a printing method of a 3D printer, which may several printouts successively.

In addition, the present disclosure provides a printing method of a 3D printer, which may ensure excellent adhesion between a printout and a bed by using a bed made of the same material as the printout.

In addition, the present disclosure provides a printing method of a 3D printer, which may output an elongated printout with a complicated inner structure.

BEST MODE

Hereinafter, preferred embodiments of the present disclosure will be described in detail with reference to the accompanying drawings. These embodiments are just for illustrations for a person having ordinary skill in the art to easily implement the present disclosure, but this does not mean that the feature and scope of the present disclosure are limited to these embodiments.

Figure 1:
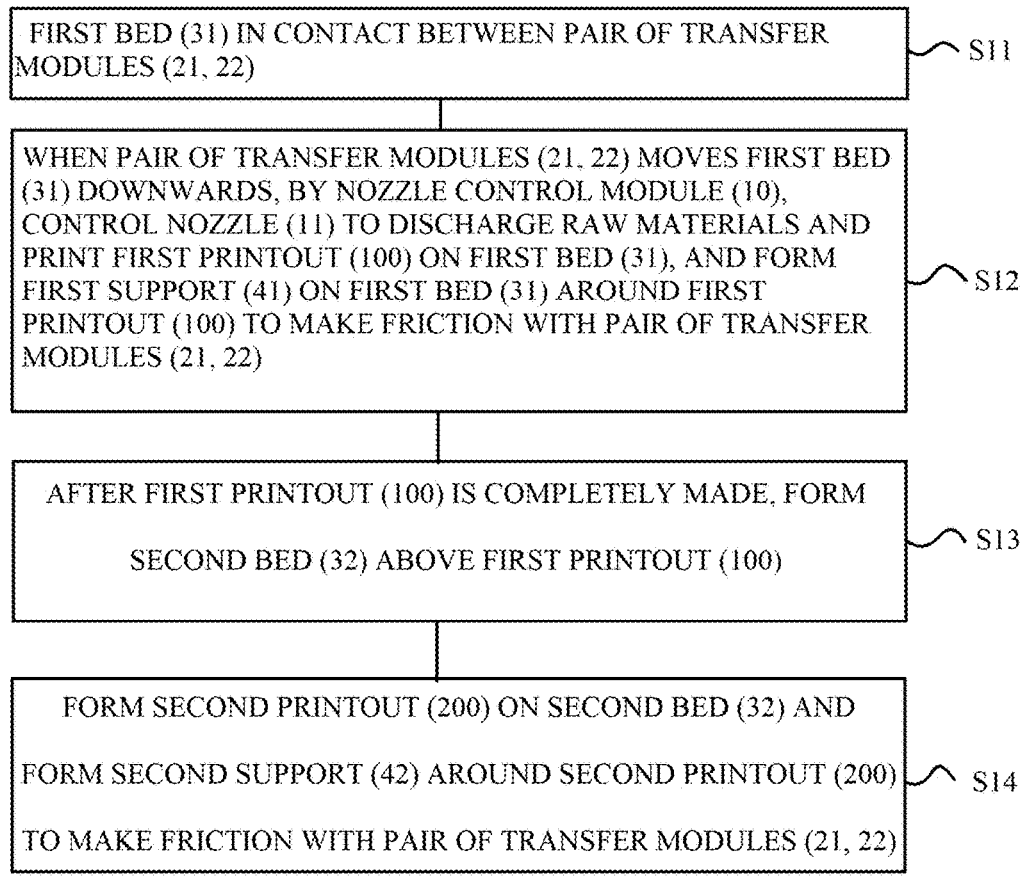
FIG. 1 is a flowchart for illustrating a printing method of a 3D printer according to an embodiment of the present disclosure.
Figure 2:
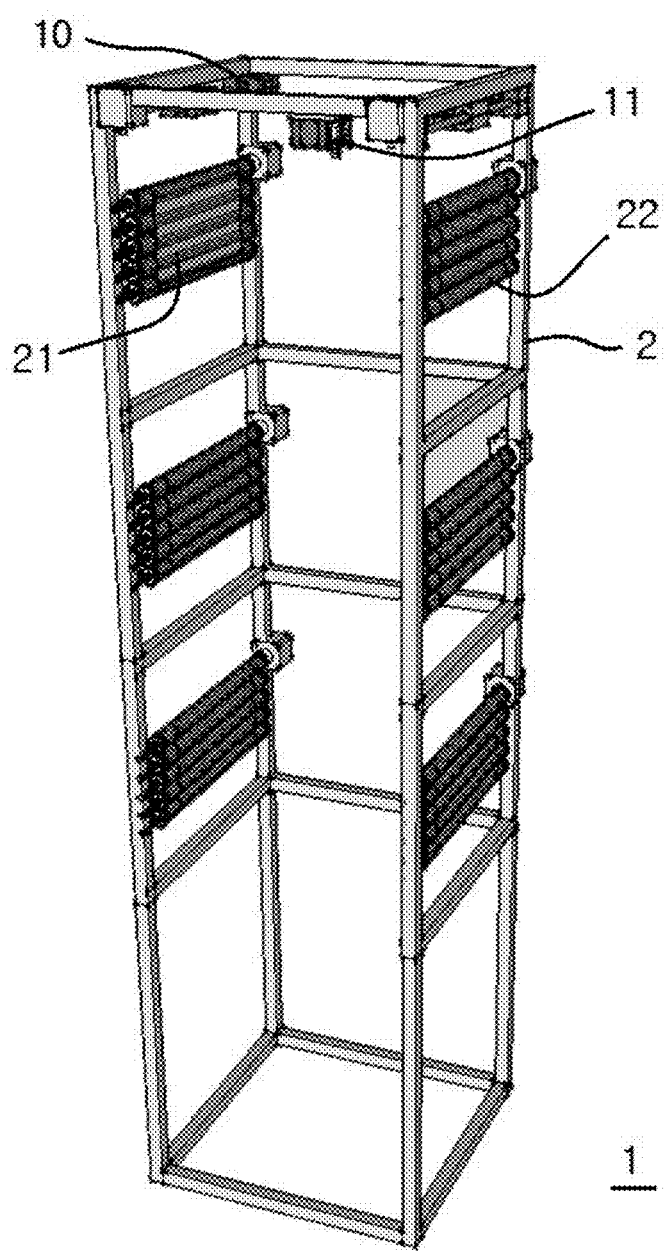
FIGS. 2 to 9 show examples of the printing method of a 3D printer according to an embodiment of the present disclosure.
Figure 3:
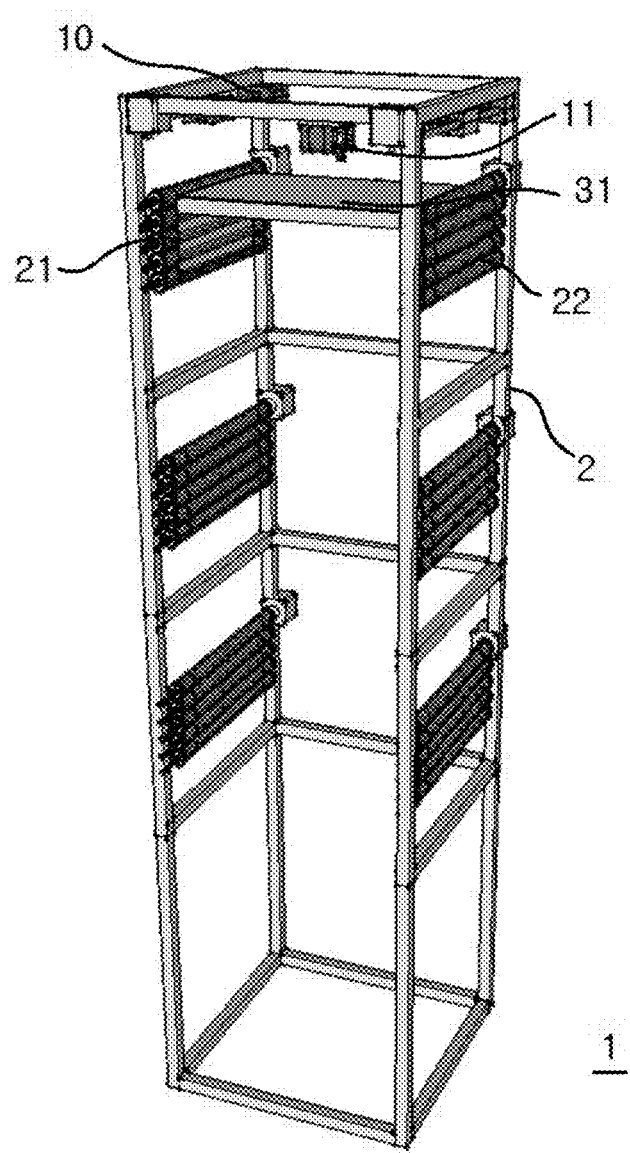

FIG. 1 is a flowchart for illustrating a printing method of a 3D printer according to an embodiment of the present disclosure, and FIGS. 2 to 9 show examples of the printing method of a 3D printer according to an embodiment of the present disclosure.

A 3D printer 1 of this embodiment includes:

a nozzle control module 10 configured to transfer a nozzle 11 to a predetermined location on a plane; and a pair of transfer modules 21, 22 disposed perpendicular to the plane and spaced apart from each other.

The nozzle control module 10 and the pair of transfer modules 21, 22 are coupled to a frame 2. The nozzle 11 is coupled to the nozzle control module 10, and the nozzle control module 10 may move the nozzle 11 to a specific location on the plane. The nozzle control module 10 includes guide bars which intersect each other, and the nozzle 11 may move along with the guide bars in x-axis and y-axis directions on the plane.

The pair of transfer modules 21, 22 is disposed perpendicular to the plane on which the nozzle 11 moves. The pair of transfer modules 21, 22 is spaced apart from each other and coupled to the frame 2. A printout is located between the transfer modules 21, 22. The pair of transfer modules 21, 22 may move the printout downwards from the nozzle 11. The transfer modules 21, 22 may adopt various configurations such as rollers, belts, caterpillars or the like.

By using the 3D printer 1 as described above, a printing method of a 3D printer is performed according to the following order.

In S11, a first bed 31 is located between a pair of transfer modules 21, 22 to be in contact with the pair of transfer modules 21, 22.

The first bed 31 is located between the pair of transfer modules 21, 22. The first bed 31 may have a hexahedral shape. As sidewalls of the first bed 31 make a friction with the pair of transfer modules 21, 22, the first bed 31 is located between the pair of transfer modules 21, 22 (see FIG. 3).

Figure 4:
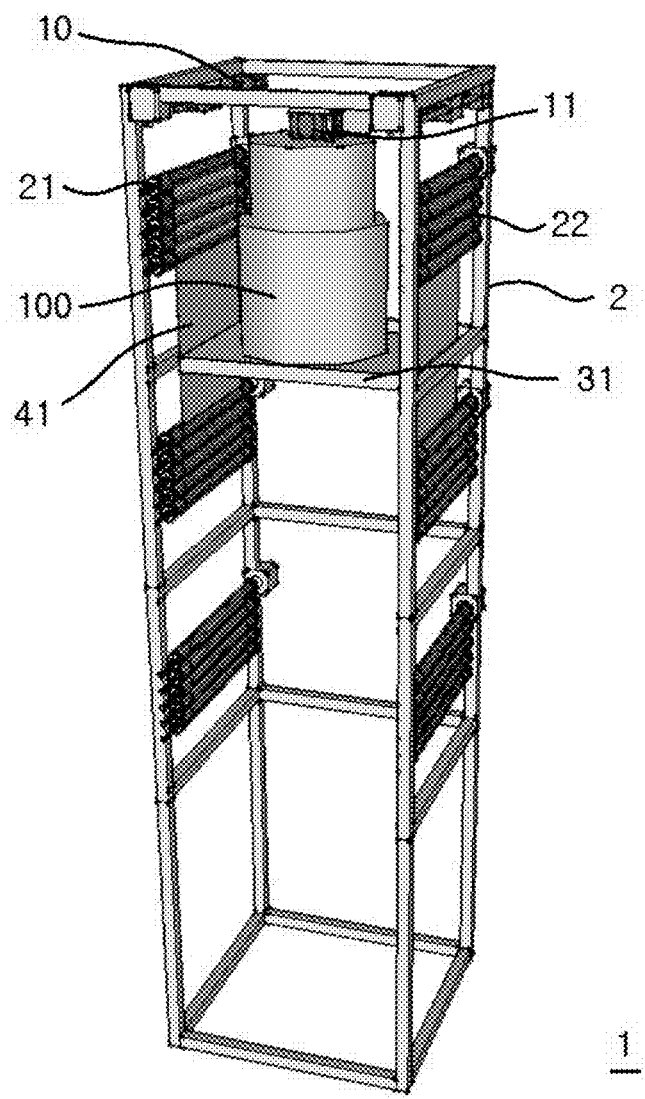
Figure 5:
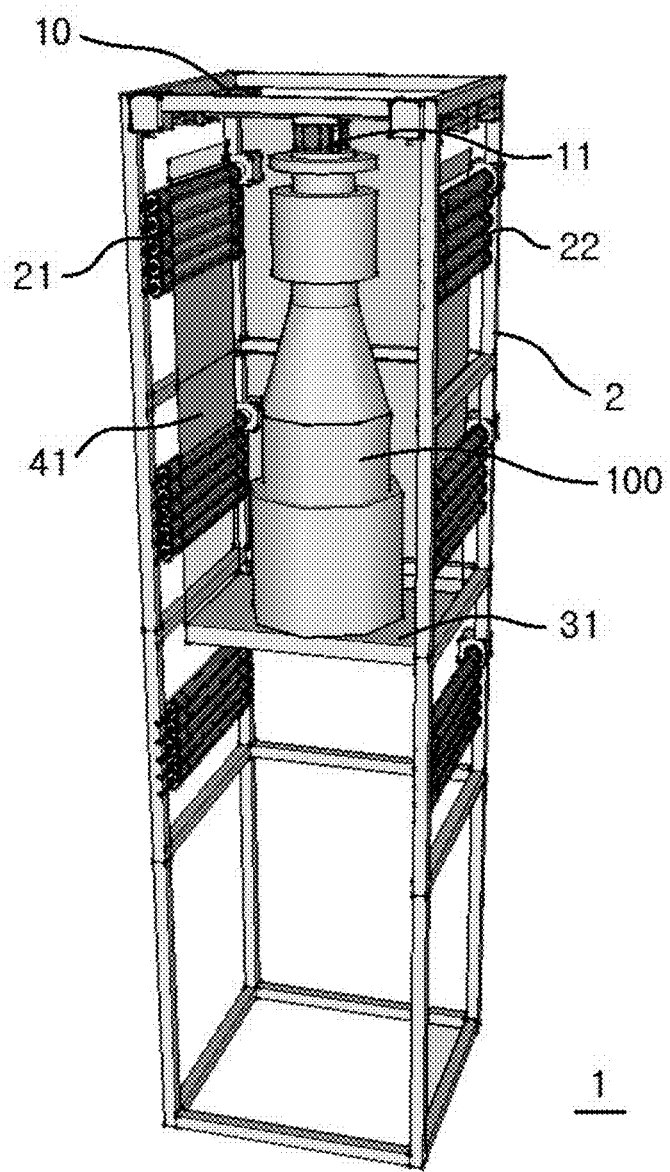
Figure 6:
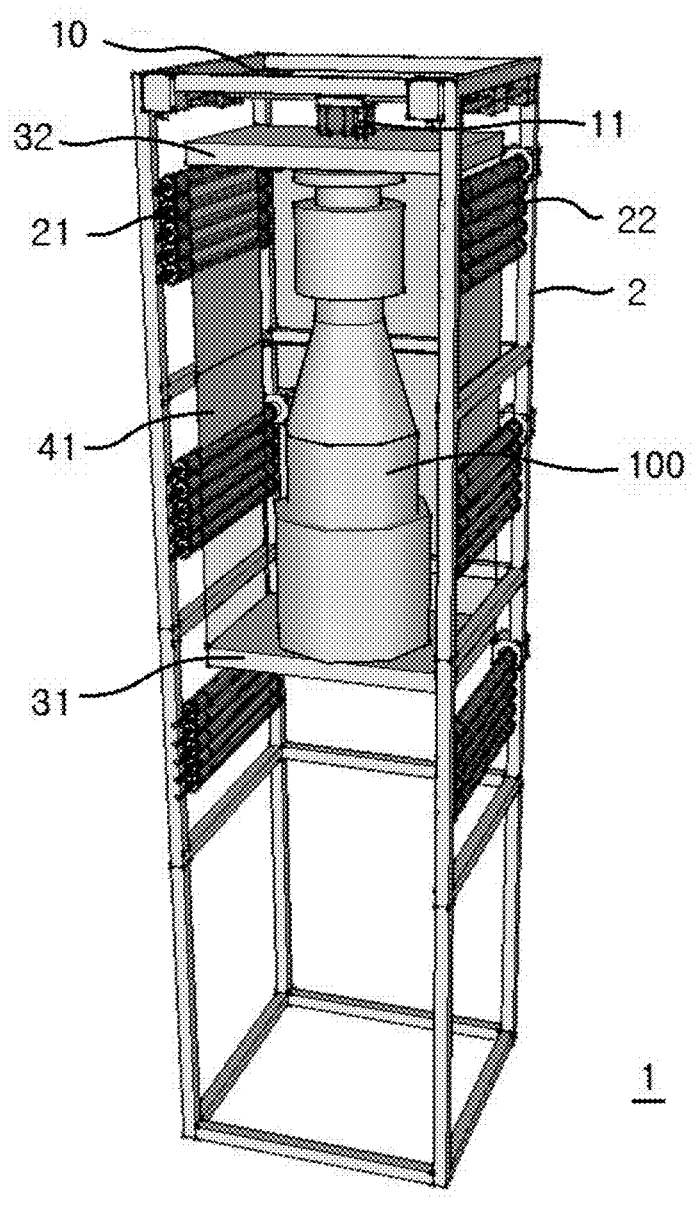
Figure 7:
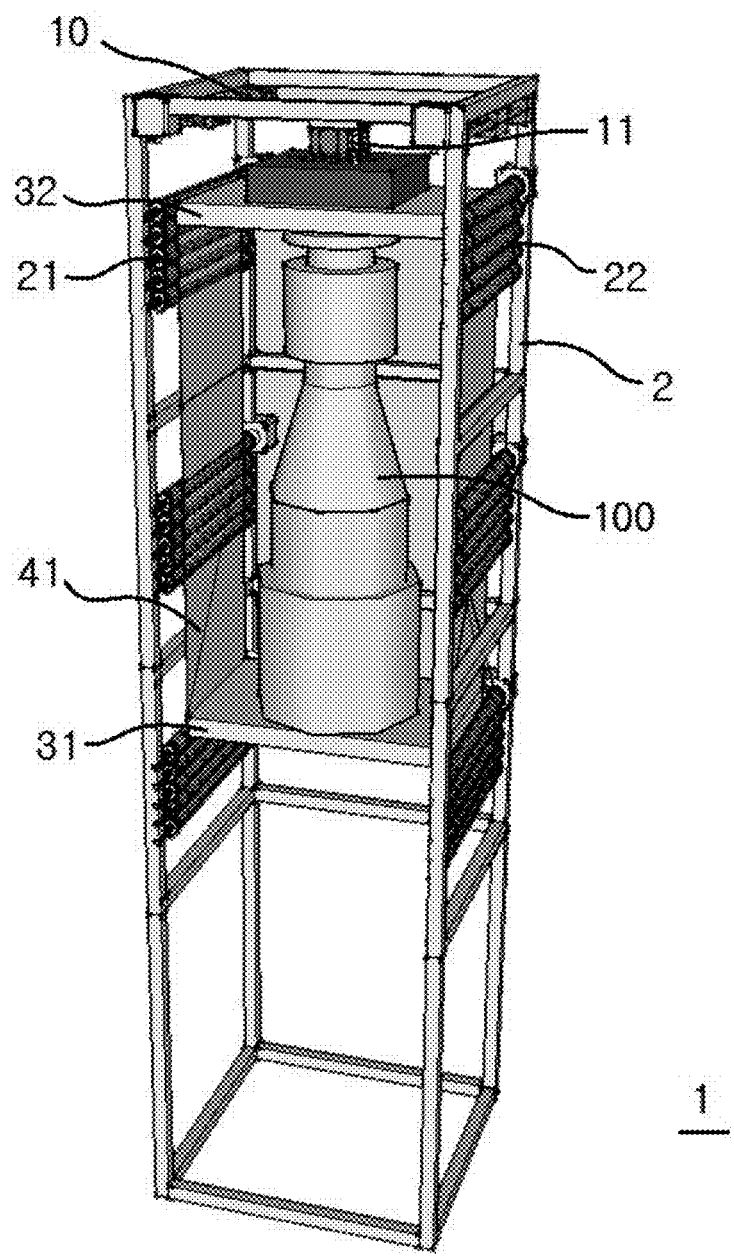
Figure 8:
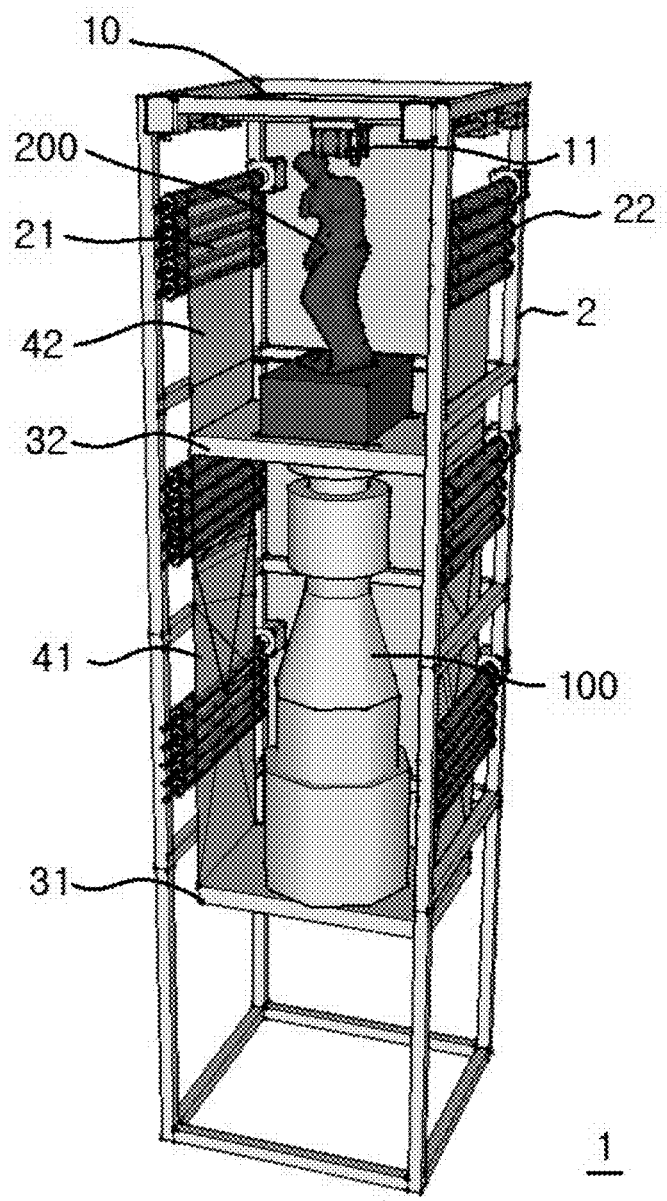
Figure 9:
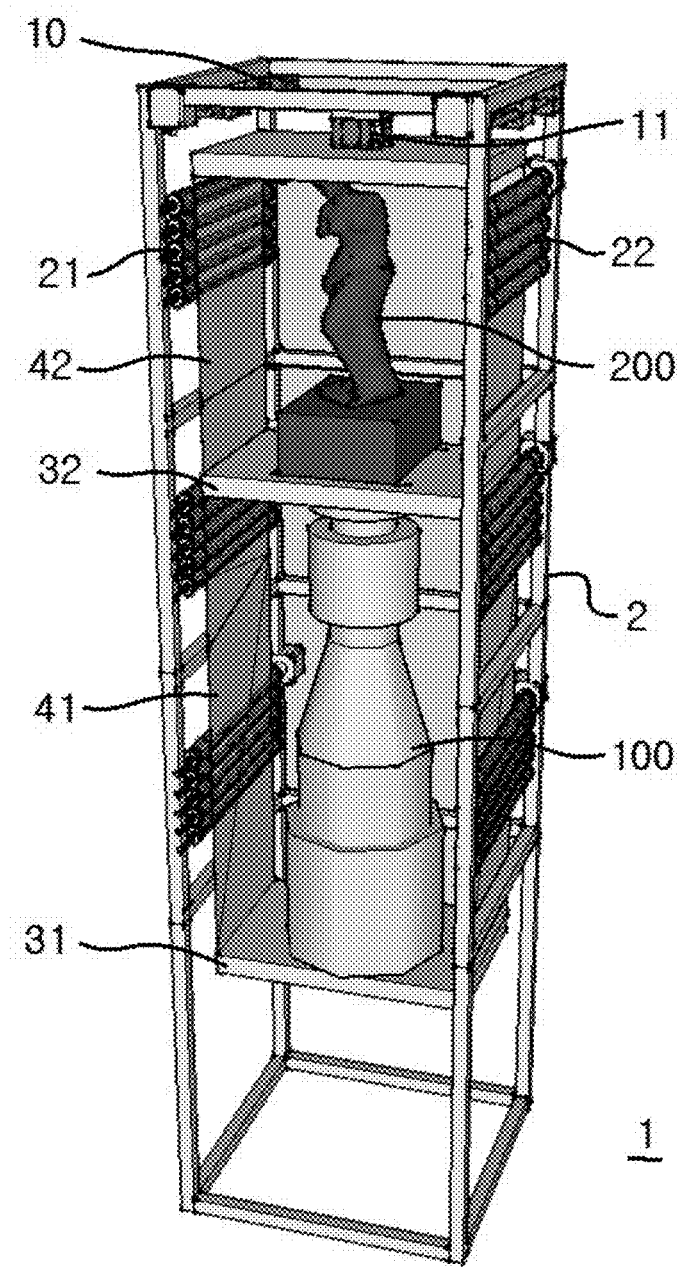

In S12, when the pair of transfer modules 21, 22 moves the first bed 31 downwards, the nozzle control module 10 controls the nozzle 11 to discharge raw materials so that a first printout 100 is printed on the first bed 31, and also forms a first support 41 on the first bed 31 around the first printout 100 to make a friction with the pair of transfer modules 21, 22 (see FIG. 4).

Even though a printout has been simply printed on a bed in an existing technique, in this embodiment, when the first printout 100 is printed on the first bed 31, the first support 41 is also printed simultaneously to be in contact between the pair of transfer modules 21, 22. The first support 41 is a kind of wall and may have a box shape. The first printout 100 is located at an inner side of the first support 41.

In the 3D printer 1 of this embodiment, after the pair of transfer modules 21, 22 push the first bed 31 downwards, the first support 41 is located between the pair of transfer modules 21, 22 to give a support force, and thus the entire structure including the first printout 100 does not fall down.

In S13, after the first printout 100 is completely made, a second bed 32 is formed above the first printout 100 to be coupled to the inner portion of the first support 41.

If the first printout 100 is completely made, a second bed 32 on which a second printout 200 is formed is printed thereon. Since the second bed 32 is made of the same material as the first printout 100 and the second printout 200, they are not deformed, for example bent, due to coupling or shrinkage thereof.

In S14, the second printout 200 is formed on the second bed 32, and also a second support 42 is formed around the second printout 200 to make a friction with the pair of transfer modules 21, 22.

While the second printout 200 is formed (or, printed) on the second bed 32, the second support 42 is also printed. The second support 42 is required for the pair of transfer modules 21, 22 to push the second bed 32 downwards. Therefore, when the second printout 200 is formed, the second support 42 is formed simultaneously to make a friction between the pair of transfer modules 21, 22. In this way, the second support 42 and the second printout 200 may be formed simultaneously.

After the second printout 200 is completely made, a third bed may be formed thereon, and a third printout and a third support may be formed on the third bed. In this way, printouts may be formed successively.

Therefore, even though a worker outputs several printouts, the printouts may be printed successively without cessation. In addition, since the bed and the printout are made of the same material, they may be coupled excellently.

Moreover, it is possible to print not only an elongated printout but also a long printout with a complicated inner structure.

The embodiments of the present disclosure have been described in detail. However, the embodiments are just for illustrations and not intended to limit the scope of the appended claims. Many changes, modifications and equivalents can be made thereto by those having ordinary skill in the art, and such changes, modifications and equivalents also fall within the scope of the present disclosure.

What is claimed is:

1. A printing method of a 3D printer, which uses the 3D printer including:
    a nozzle control module configured to transfer a nozzle to a predetermined location on a plane; and
    a pair of transfer modules disposed perpendicular to the plane and spaced apart from each other,
    the printing method comprising:
    positioning a first bed between the pair of transfer modules to be in contact with the pair of transfer modules;
    when the pair of transfer modules moves the first bed downwards, by the nozzle control module, controlling the nozzle to discharge raw materials and printing a first printout on the first bed, and forming a first support on the first bed around the first printout to make a friction with the pair of transfer modules, wherein after the pair of transfer modules push the first bed downwards, the first support is located between the pair of transfer modules and gives a support force and the first printout and the first support are supported by the pair of transfer modules with the support force;
    after the first printout is completely made, forming a second bed above the first printout; and
    forming a second printout on the second bed, and forming a second support around the second printout to make a friction with the pair of transfer modules, wherein the first support is a pair of walls extended from the first bed to the second bed.

2. The printing method of the 3D printer of claim 1, wherein the first bed and the first printout are made of the same material.

3. The printing method of the 3D printer of claim 1, wherein the first printout has a different shape from the second printout.

4. The printing method of the 3D printer of claim 1, wherein when the pair of transfer modules push the second bed downwards, the first support and the second support are located between the pair of transfer modules to give the support force; and the first printout, the second printout, the first support, and the second support are supported by the pair of transfer modules with the support force, wherein the second support is a pair of walls extended from the second bed in an opposite direction from the first bed.

5. The printing method of the 3D printer of claim 1, wherein after the second printout is completely made, forming a third bed above the second printout; and
    forming a third printout on the third bed, and forming a third support around the third printout to make a friction with the pair of transfer modules, wherein the third support is a pair of walls extended from the second bed in an opposite direction from the second bed.

6. The printing method of the 3D printer of claim 1, wherein the pair of transfer modules are comprised of at least one of rollers, belts or caterpillars.

* * * * *